No. 643,079. Patented Feb. 6, 1900.
E. J. BIRKETT & H. F. CRANDALL.
GRAIN HARVESTER.
(Application filed July 25, 1898.)
(No Model.) 7 Sheets—Sheet 1.

Fig.1

Witnesses
Harold Slater
W. Zachow

Inventors
Edward J. Birkett
Henry F. Crandall
By their Attorney
E. W. Burgess No. 643,079. Patented Feb. 6, 1900.
E. J. BIRKETT & H. F. CRANDALL.
GRAIN HARVESTER.
(Application filed July 25, 1898.)
(No Model.) 7 Sheets—Sheet 3.

Witnesses.
Harold C. Flatr
Wm Zaehow

Inventors.
Edward J. Birkett
Henry F. Crandall
By their Attorney
E. W. Burgess

THE NORRIS PETERS CO., PHOTO-LITHO., WASHINGTON, D. C.

No. 643,079. Patented Feb. 6, 1900.
E. J. BIRKETT & H. F. CRANDALL.
GRAIN HARVESTER.
(Application filed July 25, 1898.)
(No Model.) 7 Sheets—Sheet 5.

No. 643,079. Patented Feb. 6, 1900.
E. J. BIRKETT & H. F. CRANDALL.
GRAIN HARVESTER.
(Application filed July 25, 1898.)
(No Model.) 7 Sheets—Sheet 6.

Witnesses.
Harold C Slater
W. Zachow

Inventors.
Edward J. Birkett
Henry F. Crandall
By their Attorney
E. W. Burgess

THE NORRIS PETERS CO., PHOTO-LITHO., WASHINGTON, D. C.

No. 643,079. Patented Feb. 6, 1900.
E. J. BIRKETT & H. F. CRANDALL.
GRAIN HARVESTER.
(Application filed July 25, 1898.)

(No Model.) 7 Sheets—Sheet 7.

Witnesses.
Harold Flat
W. Gashow

Inventors.
Edward J. Birkett
Henry F. Crandall
By their Attorney

UNITED STATES PATENT OFFICE.

EDWARD J. BIRKETT AND HENRY F. CRANDALL, OF MILWAUKEE, WISCONSIN, ASSIGNORS TO THE MILWAUKEE HARVESTER COMPANY, OF SAME PLACE.

GRAIN-HARVESTER.

SPECIFICATION forming part of Letters Patent No. 643,079, dated February 6, 1900.

Application filed July 25, 1898. Serial No. 686,386. (No model.)

*To all whom it may concern:*

Be it known that we, EDWARD J. BIRKETT and HENRY F. CRANDALL, citizens of the United States, residing in Milwaukee, in the county of Milwaukee and State of Wisconsin, have invented certain new and useful Improvements in Grain-Harvesters, of which the following is a specification.

Our invention relates to the employment of a floating upper elevator-carrier comprising two primary members—an improved means for driving the elevator-carriers and an improved chain-tightener in connection with the same—and improvements in the construction of the fixed or stationary portion of the binder-deck in connection with the butt-adjuster.

The accompanying drawings, representing those portions of a grain-harvester necessary to illustrate the application of our invention and enable those skilled in the art to which it pertains to make and use it, are as follows, the same reference-numerals denoting like parts in the various illustrations.

Figure 1 is a front view of portions of our improved harvester, showing the manner of driving the elevator-rolls and reel countershaft. Fig. 3 is a front view of the floating elevator, showing the means by which the two members are connected and the link connection between the upper roller of the lower elevator and the floating elevator. Fig. 4 represents a train of gearing the office of which will be described later on. Fig. 5 is a detail drawing of the connecting-link between the upper roller of the lower elevator and the floating members as shown in Fig. 3. Fig. 6 is a detail of the connection between the two members of the floating elevator as shown in Fig. 3. Figs. 7, 8, 9, 10, 11, and 12 are drawings of detail parts of Fig. 3 and will be described more fully later on. Fig. 13 represents a section on line $a\ b$ of Fig. 1. Fig. 14 represents a part of Fig. 3 on line $c\ d$. Fig. 15 represents a part of the rear portion of the lower elevator and platform carriers and driving connections. Fig. 16 represents a portion of the frame construction of the lower elevator. Fig. 17 is a detail drawing of a part of Fig. 16. Fig. 18 is a drawing showing in detail the removable journal-box forming a part of Fig. 16. Fig. 19 represents in detail a member forming a part of the lower end of the elevator-frame as shown in Fig. 15. Fig. 20 represents in detail a removable journal-box designed to be inserted in the part shown in Fig. 19. Fig. 21 represents in detail a part shown in Fig. 16. Fig. 22 represents in detail a journal-box designed to be adjustably secured to the rear sill of the harvester-frame as shown in Fig. 2 and will be more fully explained later on. Fig. 23 is a section of Fig. 15 on line $e\ f$.

Figure 2:
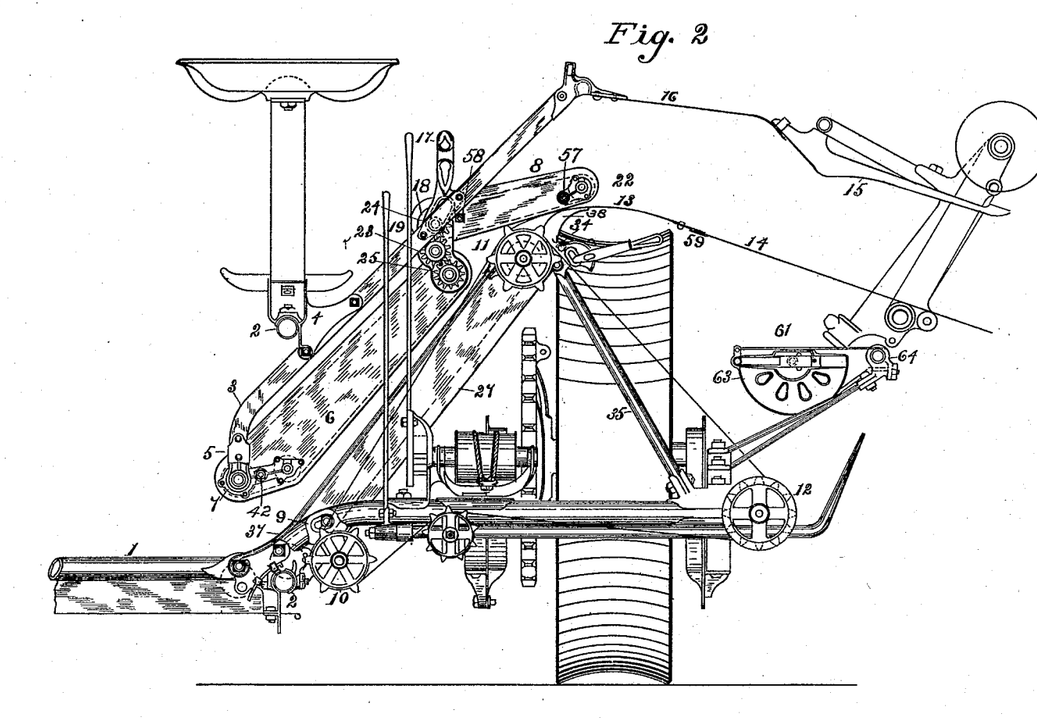
Fig. 2 is a rear view of portions of a harvester, designed to illustrate the manner in which the platform-carrier and lower elevator-carrier are driven and the manner of supporting the rear of the floating-elevator carrier.

In Fig. 2, 1 is the rear sill-pipe. 2 is the seat-supporting pipe, shown only by top and bottom sections. 3 is a supporting frame-bar secured to the seat-supporting pipe by means of the casting 4.

5 is a depending bracket secured to the lower end of the part 3 (shown in detail in Fig. 32) and forming a pivot-support for the lower end of the outer or rear side 6 of the lower member of the floating elevator by means of the journal-bearing part 7. (Shown in detail in Fig. 31.)

8 is the outer or rear side of the upper member of the floating elevator.

Figures 15, 16, 17, 18, 19, 20, 21, 22, 23:
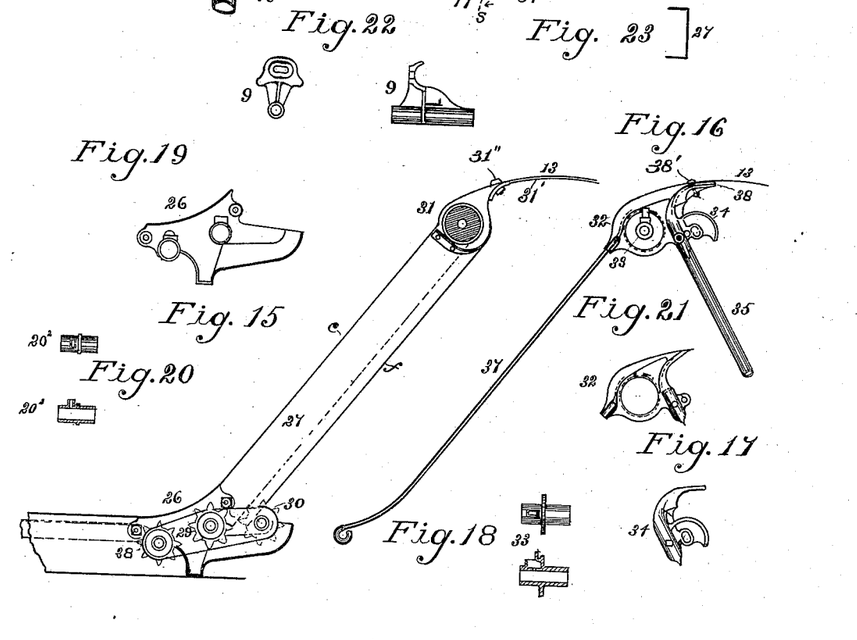

9 is a depending journal-supporting bracket adjustably secured to the frame-pipe 1 and shown in detail in Fig. 22.

10 is a sprocket-wheel upon the outer end of a short counter-shaft, which is journaled in the adjustable journal-carrying bracket 9.

11 is a sprocket-wheel upon the outer rear end of the journal of the upper roller of the lower elevator.

12 is a driving-sprocket upon the rear end of the crank-shaft.

13 is the fixed or stationary binder-deck; 14, the movable binder-deck.

15 is the breast-plate, and 16 the deflector-sheet or cover-iron.

Figures 25, 26, 27, 28, 29, 30, 31, 32, 33, 34:
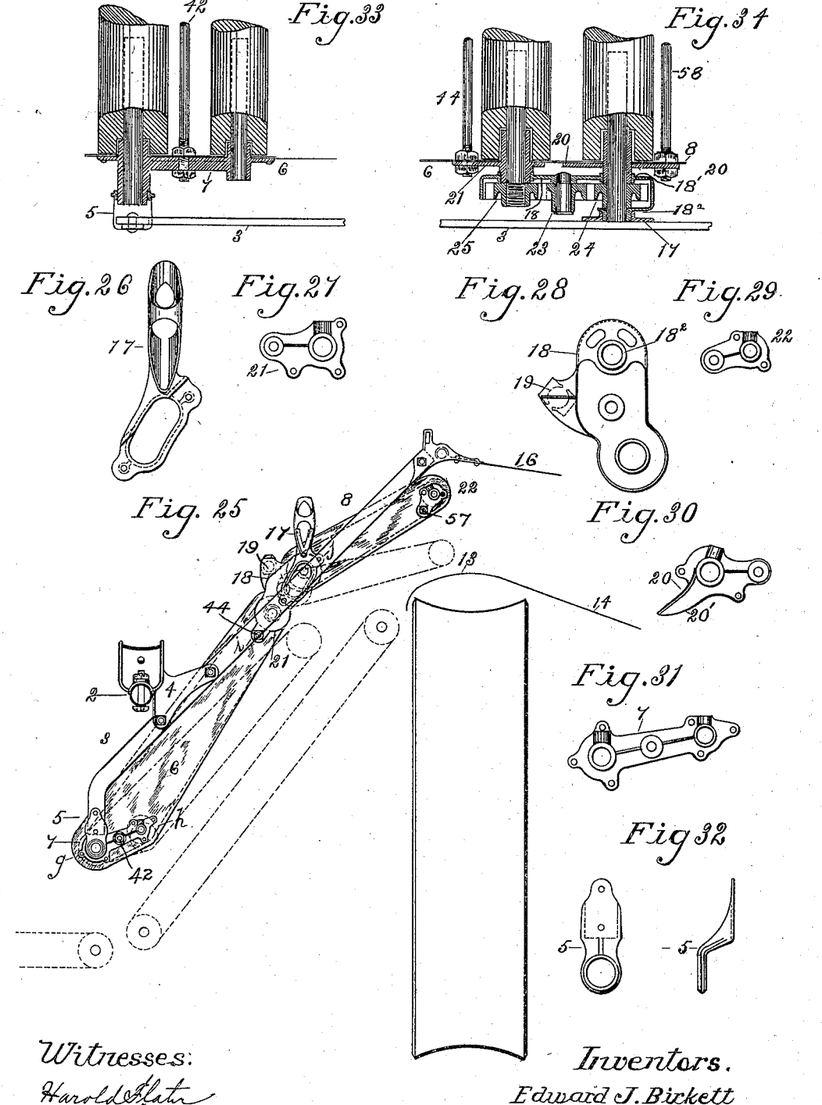
Fig. 25 represents a rear view of the floating elevator, designed to illustrate the manner in which it accommodates itself to the pressure of the grain and the manner in which it is supported and guided.
Figs. 26, 27, 28, 29, 30, 31, and 32 represent detail parts of Fig. 25.
Fig. 33 is a view, partly in section, on line $g\ h$ of Fig. 25.
Fig. 34 is a view, partly in section, on line $i\ j$ of Fig. 25.

17 is a segmental guiding-bracket secured to the supporting-bar 3 and having its guiding-slot made concentric with the axis of the upper roller of the lower elevator and combining with its upper portion the whip-socket portion, the part 17 being more clearly illustrated in Fig. 26.

18 is a connecting-link secured to the outer rear end of the rock pipe or shaft 19, (more clearly shown in Figs. 37 and 28,) the rocking pipe 19 connecting the two members of the floating elevator by means of the castings attached to its ends.

Figure 37:
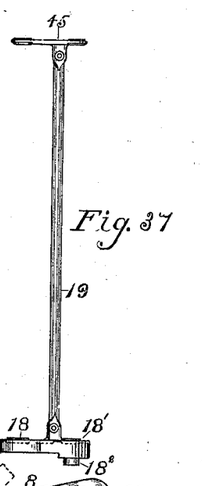
Fig. 37 represents the rocking shaft or pipe by means of which the two members of the floating elevator are connected.
Figure 38:
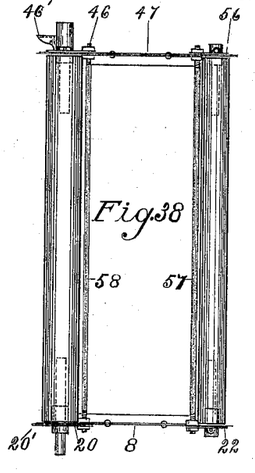
Fig. 38 is a top view of the upper member of the floating elevator.

20 is a journal-box secured to the side of frame-piece 8 at its inner or grainward end and provided with an extended portion adapted to have pivotal connection with the upper inner part 18' of the part 18, which is clearly illustrated in Figs. 34, 37, and 38. The part 20 is provided with a portion 20', projecting downward and grainward and adapted to bear against the pipe 19 for the purpose of preventing the upper member of the floating elevator from coming in contact with the stationary binder-deck 13, as shown in Fig. 35.

Figure 35:
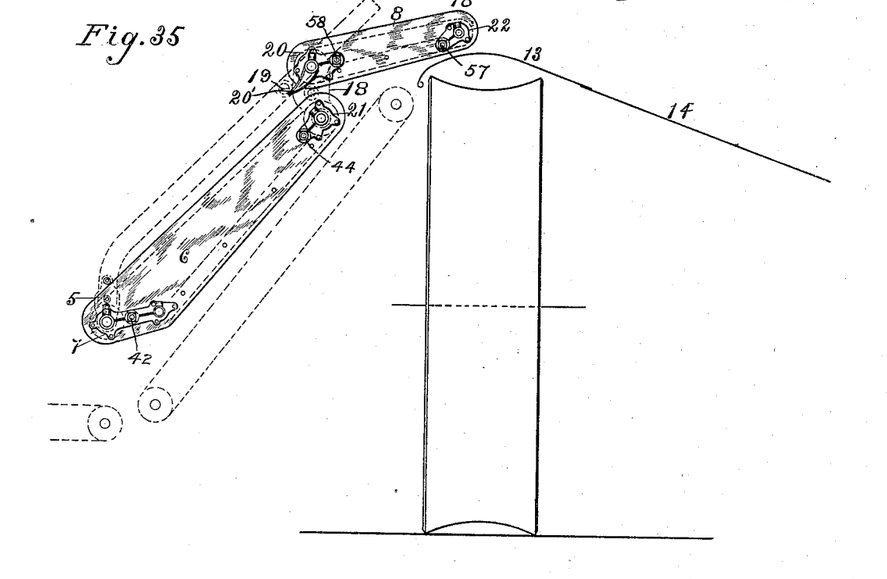
Fig. 35 is a rear view of the floating elevator.
Figure 36:
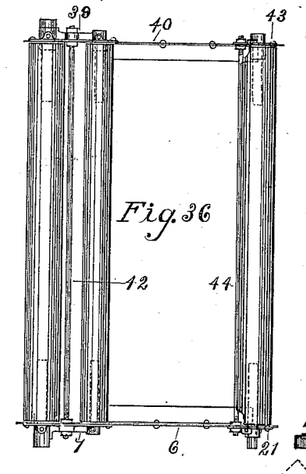
Fig. 36 is a top view of the lower member of the floating elevator.

21 is a small plate-casting provided with a journal-box and adapted to be secured to the upper end of the part 6 of the lower member of the floating elevator and having the outer rear end of its journal-box adapted for pivotal connection with the lower part of the connecting-link 18, as shown in Figs. 34, 35, and 36.

22 is a journal-box casting secured to the outer or stubbleward end of the part 8 of the upper member of the floating elevator. (Shown in detail in Fig. 29.)

The outer upper portion of the part 18 is formed with a journal-box portion $18^2$, that supports the outer rear end of the journal of the inner or grainward roller of the upper member of the floating elevator, the journal-box portion $18^2$ being adapted to move freely in the guiding-slot formed in part 17, as shown in Figs. 2 and 25. The part 18 is also provided with a stud adapted to form a journal for the intermediate pinion 23, meshing with the driving-pinion 24, secured to the journal of the inner or grainward roller of the upper member of the floating elevator and also meshing with the driven pinion 25, secured to the outer rear end of the journal of the upper roller of the lower member of the floating elevator.

Figure 24:
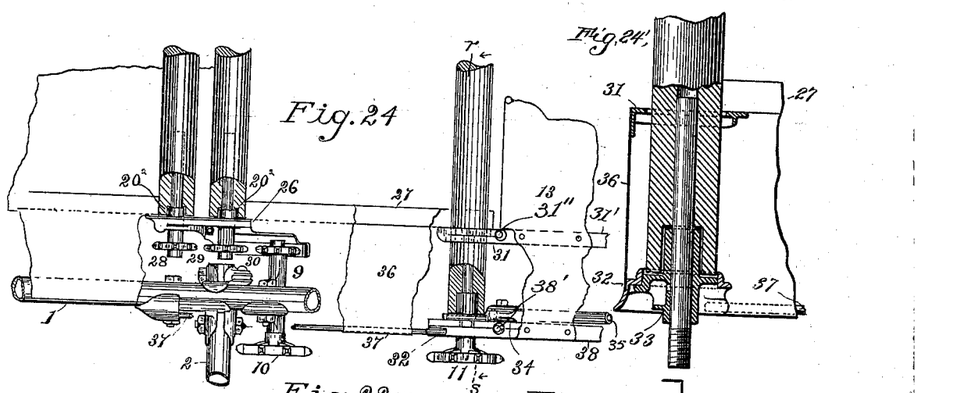
Fig. 24 represents a view, partly in section, of portions of Figs. 2, 15, and 16 and is designed to clearly show the manner in which the several parts are related.

26 is a step-casting adapted to receive the lower end of the frame-piece 27, a cross-section of said frame-piece being shown in Fig. 23. The step-casting 26 is also adapted to receive removable journal-boxes $20^2$ of a form shown in detail in Fig. 20, in which the outer rear ends of the platform-roller at the stubbleward end of the platform and the lower roller of the lower elevator are journaled. The outer or rear ends of these two roller-journals are provided with sprocket-wheels 28 and 29. Upon the inner or forward end of the short counter-shaft, journaled in the depending journal-box-carrying bracket 9, is received the small sprocket-wheel 30. The counter-shaft is driven by the sprocket-wheel 10 upon its outer rear end, and it in turn drives sprocket-wheels 28 and 29, as shown in Fig. 24. The journal-box-carrying bracket 9 being adjustably mounted upon the sill-pipe may be adjusted toward or from the driven roller sprocket-wheels in a manner similar to the ordinary chain-tighteners.

31 is a part formed to receive the upper end of the elevator frame-sheet 27 and surrounds the upper roller of the lower elevator and is adapted to receive at its outer or stubbleward end the deck-supporting bar 31', the deck-supporting bar 31' being secured to part 31 by means of the bolt or rivet 31", as shown in Figs. 15 and 24.

32 is a part shown in detail in Figs. 16 and 21 and in combination with the removable journal-box 33 (shown in detail in Fig. 18) and the part 34, (shown in detail in Fig. 17,) together with the brace-pipe 35, supports and forms a bearing for the upper roller of the lower elevator.

36 is a metal sheet secured at its inner or forward side to the frame-piece 27 and at its outer or rear side turned around the rod 37, formed with an eye at its lower end adapted to be connected to the frame-pipe, as shown in Fig. 2, and having connection at its upper end with part 32, the metal sheet 36 extending above and partially around and thereby acting as a shield for the outer rear end of the roller. The two parts 32 and 34 have secured between them, by means of the bolt or rivet 38' in a manner similar to parts 31 31' 31", Figs. 15 and 24, the deck-supporting bar 38, as shown in Figs. 24 and 16.

Figure 1:
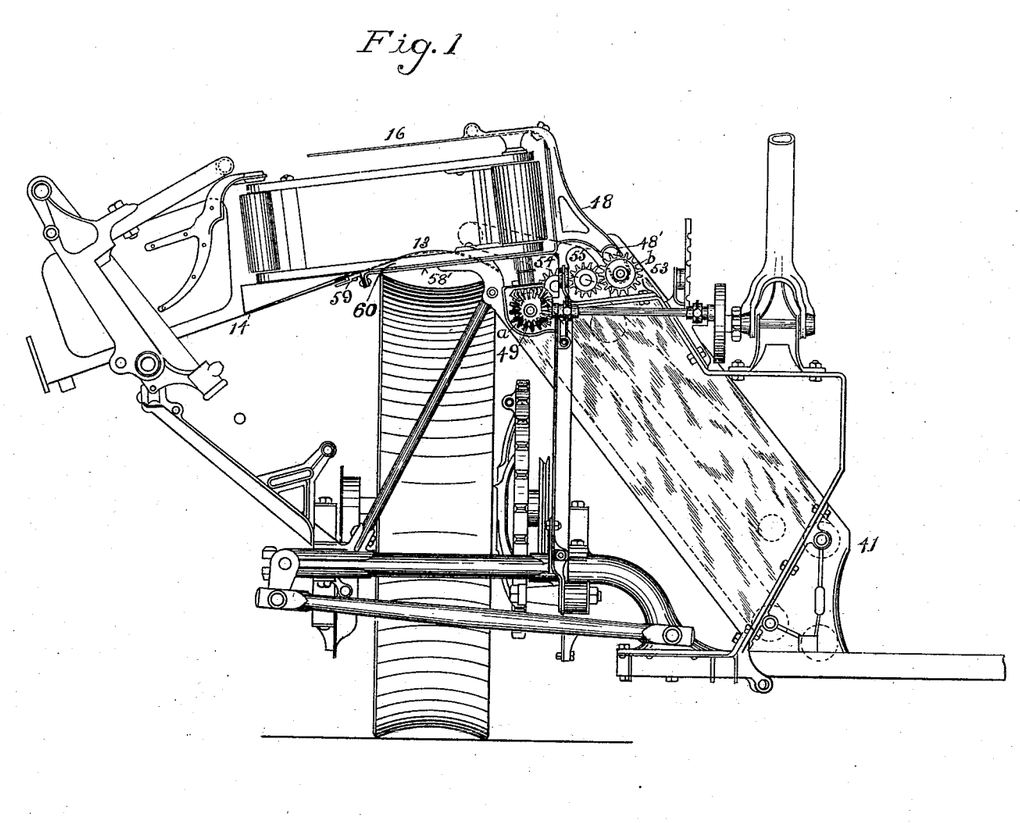
Figures 3, 4, 5, 6, 7, 8, 9, 10, 11, 12, 13, 14:
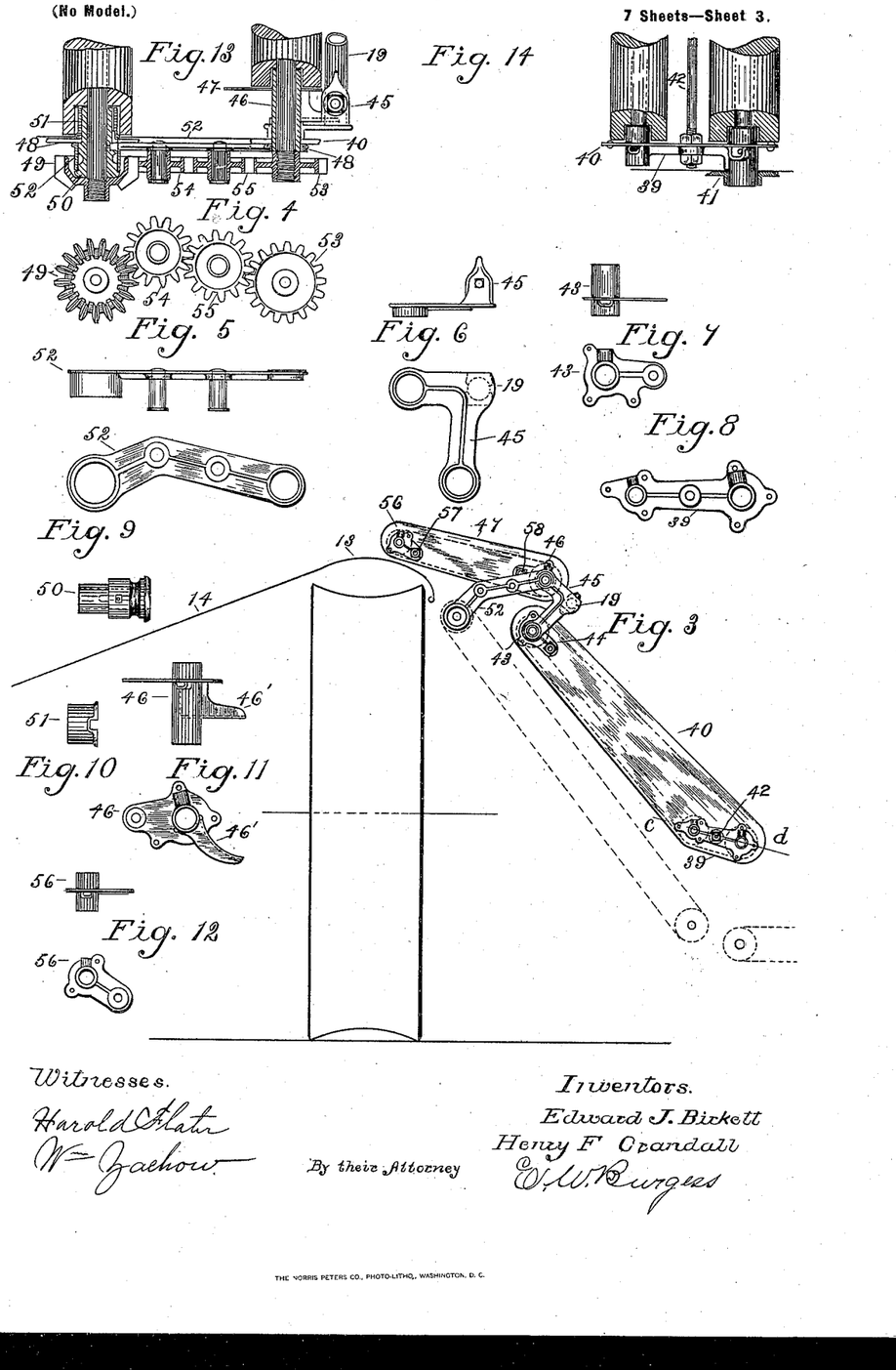

In Fig. 3 the part 39 (shown in detail in Fig. 8) is secured to the lower end of the inner or forward side 40 of the lower member of the floating elevator. It is also provided with journal-boxes supporting the inner or forward end of the two lower rollers of the floating elevator. The extended end of the lower journal-box is pivoted to the part 41, Fig. 1. Part 39, in combination with part 7, Figs. 31 and 36, and spreader or tension rod 42, together with the rollers, forms the lower end of the lower member of the floating elevator, which is free to rock upon its sustaining-pivots supported by the depending bracket 5 and part 41, Figs. 1 and 2.

43 is a journal-box casting secured to the upper end of part 40 of the lower member of the floating elevator and shown in detail in Fig. 7 and through which the spreader or tension rod 44 passes, Figs. 34 and 36.

45, which is shown in detail in Fig. 6, is a bell-crank-shaped link adapted to be fastened to the rocking pipe 19, as shown in Fig. 37.

46 (shown in detail in Fig. 11) is a journal-box piece secured to the inner or grainward end of the frame part 47 of the upper member of the floating elevator and provided with a downwardly and grainwardly projecting portion 46′, similar to portion 20′ of part 20 and adapted to rest against the rocking pipe 19 in the same manner and for the same purpose as said part 20′. The bell-crank lever or link 45 is provided at its upper and lower ends with eye portions adapted to receive the outer ends of the journal-boxes 43 and 46.

48 is a part forming the upper portion of the elevator-frame at its inner or forward end and is provided with a slot 48′ concentric with the axis of the upper roller of the lower elevator and having the same relation to said axis as the corresponding slot in part 17. On the outer end of the journal of the upper roller of the lower elevator is secured the combined spur and bevel pinion 49.

50 is a removable journal-box supported by the part 48.

51 is a thimble or loose collar placed upon the inner end of box 50 and provided with the recesses upon its inner rim that engage with projections upon the parts 50 and 48 to secure the part 50 against revolution.

52 is a swinging link pivoted around the outer end of the box 50 and having pivotal connection with the outer or forward end of journal-box 46.

Upon the outer forward end of the grainward roller of the upper member of the floating elevator is secured the spur-pinion 53, driven by the pinion 49 by means of the intermediate spur-pinions 54 and 55, journaled upon studs forming a part of the swinging link 52.

56 is a journal-box piece secured to the stubbleward end of the part 47 of the upper member of the floating elevator and is connected with the side piece 8 and part 22 by means of the tension or straining rod 57. 58 is a like straining-rod connecting the sides 8 and 47 and parts 20 and 46 at the grainward end of said upper member.

Figure 39:
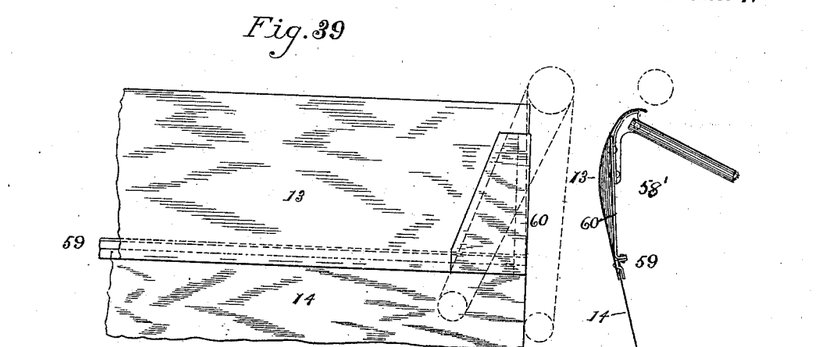
Fig. 39 represents in detail a portion of the stationary deck.

The fixed or stationary deck 13 is made of sheet metal and is supported at its outer or rearward end by the bars 31′ and 38 and at its inner or forward end by the bar 58, secured to the part 48. The fixed or stationary deck extends from a point near the delivery end of the lower elevator to a point outside of the perpendicular plane of the stubbleward side of the drive-wheel in a curved form and is connected with the sliding deck by means of the angle-iron 59, forming a groove in which the movable deck may move freely. At the inner or forward end of the stationary deck is formed the depressed portion 60, designed to allow the butt-adjuster to operate in a plane below the curved surface of the stationary deck and prevent the grain from clogging beneath it at its receiving end.

Figure 40:
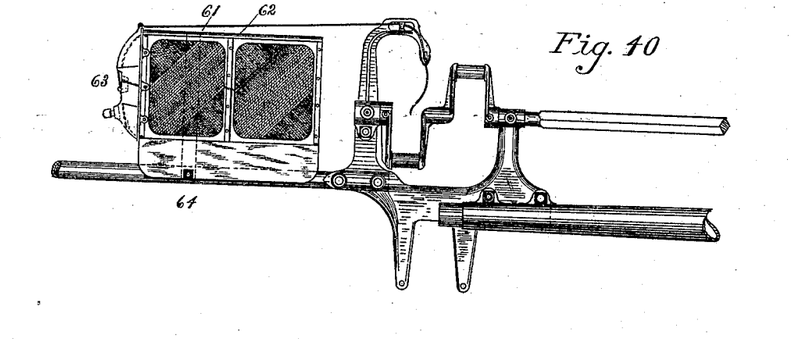
Fig. 40 is a top view of the twine-receptacle, showing the manner in which it is supported upon the binder-frame.
Figure 41:
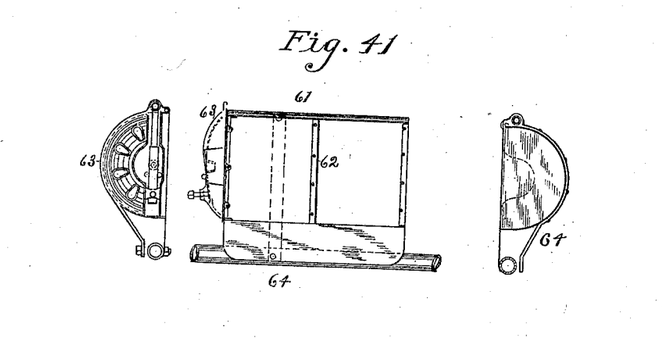
Fig. 41 represents in detail the twine-receptacle.

61 is the twine-receptacle, trough-shaped longitudinally and having the transverse partition 62, the combined end, twine tension and guide piece 63, and supporting-strap 64, which partially encircles the receptacle and extends upward and outward to the pipe-frame of the binder attachment, to which it is secured by a bolt passing through the extended horizontal portion of the sheet metal forming the body of the receptacle and said pipe.

The operation of our invention is as follows: Power is communicated from the drive-wheel to the crank-shaft by any of the well-known means, and from the crank-shaft it is transmitted to the various operative parts. We employ a sprocket-chain operating at the rear of the machine, driven by the usual sprocket upon the outer end of the crank-shaft. Near the delivery end of the platform-carrier is the short counter-shaft, from which power is transmitted to drive both the platform-carrier and the lower roller of the lower elevator. The upper roller of the lower elevator-carrier is driven by means of the sprocket-chain. By this improved construction we obtain a positive drive for both the upper and lower rollers of the lower elevator, thus enabling us to run the lower-elevator apron with a less degree of tautness than is required when only one of the rollers acts as a driver. By means of the sliding bracket secured to the sill and supporting and forming a journal-box for the short counter-shaft we are enabled to readily maintain the proper adjustment of the short supplemental sprocket-chain. From the inner or forward end of the upper roller of the lower elevator is driven the butt-adjuster and the reel in a well-known manner. The butt-adjuster is similar in form to the usual canvas-adjuster, but is operated on a lower plane for the purpose of receiving the butts of the grain directly from the delivery end of the lower elevator-carrier. To enable it to do this, we have formed the stationary deck that extends across above the drive-wheel from the delivery end of the lower elevator-carrier to the movable binder deck with a depressed or horizontal portion adapted to allow the butt-adjuster to swing transversely at its delivery end across the binder-deck in the usual manner and not allow the grain to become crowded beneath it at its receiving end, as would be the case if the curved form of the stationary deck were preserved throughout its whole length and the adjuster operating upon a higher plane. By combining with the bevel-gear that drives the butt-adjuster and reel the spur-pinion, the two intermediate pinions carried by the radius-link, and the spur-pinion on the outer end of the journal of the upper roller of the lower member of the floating carrier we obtain a compact and positive means for driving said roller. The pinion on the outer end of the rear or outer end journal of this roller, by means of the intermediate pinion carried by the link 18 and the pinion upon the journal of the receiving-roller of the upper member of the floating carrier, drives the upper floating-carrier apron.

The grain is received from the platform-carrier by the lower or receiving end of the elevator-carriers and by them is elevated to a plane above the drive-wheel. From various causes the stream of grain presented to the elevators is very variable in bulk, heavy masses of weeds and foreign growth, in addition to the crop, directly following a thin and scattered stream of grain, and when the elevator-rollers are journaled in fixed or rigid frames the heavy mass must pass through practically the same narrow space necessary to properly elevate a thin and scattered stream, thus producing at times an excessive strain upon the working parts and a consequent increase of draft and injury.

In our improved construction, the upper elevator is composed of two primary members hinged or coupled together, and having the lower member pivoted at its lower end in sustaining-supports, and having its upper end free to rise and fall upon the stream of grain. The grainward end of the upper member of our floating elevator being connected to the upper or stubbleward end of the lower member is thereby raised when the said upper end rises and is maintained concentric with the axis of the upper roller of the lower elevator by means of the radius-bar 52. Should there be a greater bulk of grain at one side of the elevator than the other, and thus produce an unequal lifting force to act upon the floating members, the torsional strength of the rocking pipe, in combination with the segmental guide-slots in parts 48 and 17, will maintain the upper roller of the lower member and the receiving-roller of the upper member of the floating elevator parallel with the lower elevator-carrier. The upper member of the floating carrier is similar in construction and operation to that of the supplemental carrier described in United States Patent No. 592,280, granted October 26, 1897, to Henry F. Crandall for harvester-elevators. Like the supplemental carrier therein mentioned the upper member of our floating elevator is free to rise and fall upon the stream of grain and is allowed to vibrate relatively to the horizontal line of the deck. The improvement consists in connecting the grainward or receiving end of the supplemental carrier to the floating upper or delivery end of the elevator-carrier. By means of this improvement we obtain an elevator-carrier that automatically yields at its delivery end to the stream of grain and by means of its jointed construction adapts it to assume a position that will successfully elevate and forcibly convey and feed the grain above and across the curved stationary binder-deck above the drive-wheel to the binding mechanism, and during the part of the operation when the needle is carried forward and the grain is held back by the guard the carrier will rise and increase the size of the storage capacity.

In constructing the parts 31 and 32 provision is made for easily replacing the upper roller of the lower elevator. In like machines as heretofore constructed it has been necessary to remove a great many parts of the structure in order to take out the said roller. We remove this evil by making the opening in the parts 31 and 32 large enough to admit the roller being readily passed through and adapting the removable journal-box 33, by means of the enlarged collar portion, to fill the opening in part 32, as shown in detail in Figs. 15, 16, 18, and 21.

The advantages of our improved twine-receptacle consist in adapting it to be placed beneath the deck of the binder attachment contiguous to the needle, so that the twine can be guided toward the needle with a less number of guiding-eyes. In making it trough shape in cross-section and open at the top the balls of twine can be placed in the receptacle without the trouble of removing and replacing any part of said receptacle. By placing a partition across and dividing the receptacle in two equal parts the balls are prevented from striking against each other and causing the lighter or nearest-exhausted ball to collapse and become tangled.

Having thus described our invention, what we claim as new, and desire to secure by Letters Patent, is—

1. In a harvester, a platform, and a platform-carrier adapted to convey the grain to the receiving end of the elevator, a driving-roller for the platform-carrier having its outer or rear journal supported by a bracket secured to said platform, a chain-wheel upon the outer end of said journal, a counter-shaft parallel with said carrier-roller and located outside of the rear edge of the said platform-carrier, a chain-wheel upon said counter-shaft, means for driving said counter-shaft, and flexible connection between said chain-wheels.

2. In a harvester, a platform and a platform-carrier adapted to convey the grain to the receiving end of the elevator, a driving-roller for the platform-carrier having its outer or rear journal supported by a bracket secured to said platform, a chain-wheel upon the outer end of said journal, the lower roller of the elevator-carrier having its outer or rear end journal supported also in said bracket, a chain-wheel upon the outer end of said journal of said elevator-roller, a counter-shaft parallel with said carrier and elevator rollers and located outside of the rear edge of said carriers, a chain-wheel upon said counter-shaft, means for revolving said counter-shaft, and a flexible connection between said chain-wheels.

3. In a harvester, a driving mechanism for the platform and elevator carriers comprising the following instrumentalities in combination, the platform-carrier roller at the stubbleward side of the platform, the lower and upper rollers of the lower elevator-carrier, the counter-shaft located outside of the rear and outer edge of said carriers, the supporting-bracket 9 adjustably secured to the rear sill 1, and in which the said counter-shaft is journaled, the step-piece 26 supporting the journals at the outer rear ends of the said platform-carrier roller and said lower elevator-roller, the chain-wheels 28 and 29 upon the outer ends of said journals, the chain-wheel 30 upon the inner forward end of said counter-shaft, and a flexible connection between said chain-wheels, a chain-wheel upon the outer end of the counter-shaft, a chain-wheel upon the outer end of the outer or rear journal of the upper roller of the lower elevator-carrier, a chain-wheel upon the outer end of the harvester crank-shaft, means for driving said shaft, and flexible connection between said chain-wheels substantially as described.

4. In a harvester, the combination of the step part 26, the parts 31 and 31', the parts 32 and 34, brace-rod 37, and brace-piece 35, angle-iron 27, metal sheet 36, part 38 and removable journal-box 33, substantially as and for the purpose described.

5. In a harvester-elevator designed to receive the grain from a platform-carrier and elevate it to a plane above the drive-wheel between two moving carriers, the combination of an upper carrier comprising two primary members, the lower member being supported at its lower end upon pivotal supports located above the delivery end of the platform-carrier and having its upper end extended upward, the upper member jointed at its lower end to the upper end of the lower member.

6. In a harvester-elevator designed to receive the grain from a platform-carrier and elevate it to a plane above the drive-wheel between two moving carriers, the combination of an upper carrier comprising two primary members, the lower member being supported at its lower end upon pivotal supports located above the delivery end of the platform-carrier, and having its upper end extended upward; the upper member being connected to the lower member by means of links pivoted around the axis of the rear and forward journals of the upper roller of the said lower member and the grainward roller of said upper member, said links being secured to opposite ends of a rock-shaft, substantially as shown and described.

7. In a harvester-elevator adapted to receive the grain from a platform-carrier and elevate it to a plane above the drive-wheel between two moving carriers, the combination of an upper carrier comprising two primary members, the lower member being supported at its lower end upon pivoted supports located above the delivery end of the platform-carrier and having its upper end extended upward, the upper member being connected to the lower member by means of links pivoted around the axis of the rear and forward journals of the upper roller of said lower member and the grainward roller of said upper member, said links being secured to opposite ends of a rock-shaft and supported at their upper ends in the segmental guide-slots substantially as shown and for the purpose described.

8. In a harvester-elevator of the class described, a jointed two-part upper elevator hinged at its lower end to portions of the harvester-frame and adapted to float upon the stream of grain at its upper end substantially as described.

9. In a harvester-elevator of the class described, a jointed two-part upper elevator hinged at its lower end to portions of the harvester-frame and adapted to float upon the stream of grain at its upper end, in combination with a radius-bar connecting the axis of the forward journal of the upper roller of the lower elevator-carrier to the axis of the forward journal of the grainward roller of the upper member of said jointed two-part upper elevator, the pinions upon the outer ends of said journals with the intermediate pinions carried by said radius-bar substantially as and for the purpose described.

10. In a harvester-elevator adapted to receive the grain from the delivery end of a platform-carrier and elevate it between two moving surfaces to a plane above the drive-wheel, an upper elevator-carrier comprising two primary members that have the axes of their driving-rollers connected by links secured to opposite ends of a rock-shaft and having portions of the upper member of said upper elevator-carrier frame adapted to rest against the rock-shaft and limit the downward movement of the stubbleward end of said upper member, substantially as shown and described.

11. In a harvester, an upper elevator-carrier frame comprising two sections having a hinged connection, said compound frame consisting of the metal side sheets 6, 8, 40 and 47, the journal-box plates 7 and 39, secured to the lower ends of the side sheets 6 and 40 and connected by the tension-rod 42; the journal-box plates 21 and 43 secured to the upper ends of the side pieces 6 and 40 and connected by the tension-rod 44; the journal-box plates 20 and 46 secured to the grainward ends of sheets 8 and 47 and connected by the tension-rod 58; the journal-box plates 22 and 56 secured to the stubbleward end of said sheets and connected by the tension-rod 57, the rock-shaft 19 with parts 18 and 45 adapted to receive the extended ends of the journal-boxes forming parts of journal-box plates 21, 43, 20 and 46; the whole arranged and constructed substantially as and for the purpose set forth.

12. In a harvester, an elevator adapted to receive the grain from the platform-carrier and elevate it to a plane above the drive-wheel between two moving carriers, an upper elevator-carrier comprising two primary parts hinged together and adapted to float upon the stream of grain, said upper elevator-carrier supported at its rearward side by the depending bracket-piece 5, in which the lower end of the rear side of the lower member is pivoted, said bracket-piece being secured to the bar 3, said bar being secured to the bracket-piece 4, which is secured to the seat-supporting pipe 2, the portion $18^2$, of the part 18, the part 17 secured to the bar 3 and the part 18 supported and guided by the part 17 substantially as shown and described.

13. In a harvesting-machine, an elevator adapted to receive the grain from the platform-carrier and elevate it to a plane above the drive-wheel between two moving carriers, an upper elevator-carrier composed of two primary parts hinged together, in combination with a supporting-frame having guideways secured thereto and adapted to guide said floating elevator in a manner substantially as and for the purpose described.

14. In a harvester-elevator the frame-piece 48, the journal of the elevator-roller in combination with the journal-box 50, the thimble 51, and the radius-bar 52, pivoted upon the journal-box 50 substantially as described.

15. In a harvester, a moving butt-adjuster in combination with a fixed or stationary bridge or deck extending from a point near the delivery end of the elevator to a point stubbleward of the drive-wheel in a curved form, and having the depressed portion substantially as and for the purpose described.

16. In a harvester in combination with a moving butt-adjuster adapted to swing toward or from the tying mechanism at its delivery end, a curved bridge or deck extending across and bridging the space between the delivery end of the elevators and the movable binder-deck, said curved bridge being provided with a depressed portion approximately in the same plane as the lower surface of said butt-adjuster.

EDWARD J. BIRKETT.
HENRY F. CRANDALL.

Witnesses:
LOUIS O. ZEDLER,
EDWARD F. OTTO.